United States Patent [19]
Ide

[11] Patent Number: 6,005,479
[45] Date of Patent: Dec. 21, 1999

[54] SIDE IMPACT PASSENGER PROTECTION SYSTEM FOR VEHICLE AND CRASH DETERMINATION DEVICE OF SAME

[75] Inventor: Seiya Ide, Okazaki, Japan

[73] Assignee: Denso Corporation, Kariya, Japan

[21] Appl. No.: 09/004,726

[22] Filed: Jan. 8, 1998

[30] Foreign Application Priority Data

Jan. 10, 1997 [JP] Japan ................................. 9-003328
Oct. 13, 1997 [JP] Japan ................................. 9-279104

[51] Int. Cl.[6] ................................................. B60Q 1/00
[52] U.S. Cl. ........................ 340/438; 340/669; 180/282; 280/735; 307/10.1; 364/424.05
[58] Field of Search .................................. 340/438, 436, 340/669; 364/424.05; 180/282, 274; 280/735; 307/10.1

[56] References Cited

U.S. PATENT DOCUMENTS

| | | | |
|---|---|---|---|
| 4,574,168 | 3/1986 | Devaney | 200/61.53 |
| 5,202,831 | 4/1993 | Blackburn et al. | 364/424.05 |
| 5,440,913 | 8/1995 | Crispin et al. | 73/1 D |
| 5,515,276 | 5/1996 | Kura et al. | 364/424.05 |
| 5,544,915 | 8/1996 | Fendt et al. | 280/735 |
| 5,555,174 | 9/1996 | Okimoto et al. | 364/424.05 |
| 5,620,203 | 4/1997 | Jeenicke et al. | 280/735 |
| 5,667,244 | 9/1997 | Ito et al. | 280/735 |
| 5,746,444 | 5/1998 | Foo et al. | 280/735 |

FOREIGN PATENT DOCUMENTS 748 725  12/1996  European Pat. Off. .

*Primary Examiner*—Edward Lefkowitz
*Assistant Examiner*—Davetta Woods
*Attorney, Agent, or Firm*—Pillsbury Madison & Sutro LLP

[57] ABSTRACT

A crash determination device employed in a vehicle side impact passenger protection system uses logic circuits or microcomputers to correctly determine whether an impact is a crash with an obstruction such as another vehicle by making use of a phase difference between detected accelerations of a side acceleration sensor and a central acceleration sensor. By making use of the phase difference between detected accelerations of side and center acceleration sensors, a high-speed crash can be correctly distinguished from a low-speed impact and an erroneous determination resulting in the passenger protection system being operated in a side impact situation not necessitating operation of the passenger protection system can be avoided.

22 Claims, 9 Drawing Sheets

SIDE IMPACT PASSENGER PROTECTION SYSTEM FOR VEHICLE AND CRASH DETERMINATION DEVICE OF SAME

CROSS REFERENCE TO RELATED APPLICATION

This application is based upon and claims the benefit of priority of Japanese Patent Applications No. H.9-3328 filed on Jan. 10, 1997 and No. H.9-279104 filed on Oct. 13, 1997, the contents of which are incorporated herein by reference.

BACKGROUND OF THE INVENTION

1. Field of the Invention

This invention relates to a side impact passenger protection system for a vehicle and to a crash determination device thereof.

2. Related Art

A passenger protection system for a vehicle of the related art is disclosed in for example Japanese Patent Application Laid-Open No. H.8-67231. This passenger protection system has a central acceleration sensor mounted in the middle of a car and side acceleration sensors mounted in the vicinities of center pillars in the left and right sides of the car. The central acceleration sensor detects a crash between an obstruction and the front or sides of the car. The left side acceleration sensor detects a crash between an obstruction and the left side of the car, and the right side acceleration sensor detects a crash between an obstruction and the right side of the car.

When a detection signal of the central acceleration sensor exceeds the largest of a number of threshold values, or when it exceeds a threshold value smaller than the largest of a number of threshold values and also a detection signal of the side acceleration sensor exceeds a certain threshold value, the car is determined to be in a crash and the passenger protection system is operated.

In this kind of passenger protection system, for example when an impact not necessitating operation of the passenger protection system occurs at a front wheel of the car, as happens when a front wheel mounts a curb, this impact tends to be transmitted to the central acceleration sensor earlier than to the side acceleration sensors. Consequently, the rise of the acceleration that the central acceleration sensor detects is rapid and the detected acceleration itself is also high. As a result, when threshold values of the kind mentioned above are used alone there is a possibility of the passenger protection system operating erroneously.

In this connection, the present inventors have conducted various studies into car side crash situations. Generally, at the time of a car side crash the time available for making the crash determination necessary to operate the passenger protection system is extremely short. For this reason it is necessary to employ the kind of side acceleration sensor mentioned above. However, in the side acceleration sensor, even a slight impact (an impact not necessitating operation of the passenger protection system) directly hitting the vicinity of a side acceleration sensor produces a relatively large acceleration.

On the other hand, even if an impact is one necessitating operation of the passenger protection system such as that of another car crashing into a door of the present car diagonally from the front, when that impact does not hit the side acceleration sensor directly the acceleration occurring at the initial stage of the impact is of a level below the acceleration resulting from the above-mentioned slight impact directly hitting the side acceleration sensor vicinity.

Consequently, using an acceleration caused by this kind of impact it is not possible to determine correctly within the kind of short crash determination time mentioned above that the impact is a crash of the car.

When detailed studies into this kind of phenomenon were carried out, the following results were obtained.

Because as shown in FIG. 9 and FIG. 11 each side acceleration sensor (hereinafter called the side acceleration sensor 1) is mounted in the vicinity of a center pillar in the side of the car, the side acceleration sensor 1 is disposed in a part of the car that is more rigid than other parts. It was found that in cases where this kind of mounting has been carried out, with a slight impact directly hitting the vicinity of the side acceleration sensor 1, there is almost no phase difference (see FIG. 10A) between the detected accelerations of the side acceleration sensor 1 and the central acceleration sensor (hereinafter called the central acceleration sensor 2). This is also the same in a case where another car crashes at low speed into the side of the present car as shown in FIG. 9. In FIG. 10A, P1 and R1 are graphs showing change of an integral output obtained by integrating the detection signal of a central acceleration sensor 2 and Q1 is a graph showing change of an integral output obtained by integrating the detection signal of a side acceleration sensor 1.

The rigidity of the doors of the car, on the other hand, is low compared with that of the above-mentioned center pillar vicinity. It was found that for this reason in a high-speed crash wherein another car crashes into a door of the present car diagonally from the front as shown in FIG. 11, the phase of the detected acceleration of the side acceleration sensor leads the phase of the detected acceleration of the central acceleration sensor and the phase difference between the two detected accelerations is large (see FIG. 12A). In FIG. 12A, P2 and R2 are graphs showing change of an integral output of the detection signal of a central acceleration sensor 2 and Q2 is a graph showing change of an integral output of the detection signal of a side acceleration sensor 1.

SUMMARY OF THE INVENTION

It is therefore an object of the present invention to provide a side impact passenger protection system for a vehicle and a crash determination device employed in this passenger protection system constructed to correctly determine whether an impact is a crash with an obstruction such as another vehicle by making use of a phase difference between detected accelerations of a side acceleration sensor and a central acceleration sensor.

A side crash determining device according to the present invention is provided in a side impact passenger protection system installed in a vehicle for operating the passenger protection system. The side crash determining device has first acceleration sensors mounted in the vicinities of high-rigidity parts of the sides of a vehicle for detecting as an acceleration a crash between either of vehicle sides and an obstruction and a second acceleration sensor mounted in a central part of a vehicle body for detecting as an acceleration a crash between either of the vehicle sides and the obstruction. An integrating device integrates the detected accelerations of one of the first acceleration sensors and the second acceleration sensor and outputs as first and second integral outputs respectively. A phase determining device determines whether the first integral output is leading in phase or lagging in phase with respect to the second integral output when the first and second integral outputs have been outputted from the integrating device according to integration of said detected accelerations in predetermined integration periods. Further, a crash determining device determines on the basis of at least one of the first and second integral outputs that the vehicle is in a high-speed crash between a low-rigidity part of one of the vehicle sides and that obstruction such that it is necessary for the passenger protection system to be operated when the phase determining device determines the first integral output to be leading in phase and determines on the basis of at least one of the first and second integral outputs that the vehicle is in a low-speed crash between one of the high-rigidity parts and the obstruction such that it is necessary for operation of the passenger protection system to be prohibited when the phase determining device determines the first integral output to be lagging in phase.

By making use of the phase difference between the detected accelerations of first and second acceleration sensors, a high-speed crash can be correctly distinguished from a low-speed impact. Therefore, an erroneous determination resulting in the passenger protection system being operated in a side impact situation not necessitating operation of the passenger protection system can be avoided.

If a logical multiplier gate is used as a crash determining device, it is possible to prevent an impact caused by hammering on the side of a car or by the slamming of a door from being erroneously determined to be a crash.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

Preferred embodiments of the present invention will now be described with reference to the accompanying drawings.

(First Preferred Embodiment)

Figure 1:
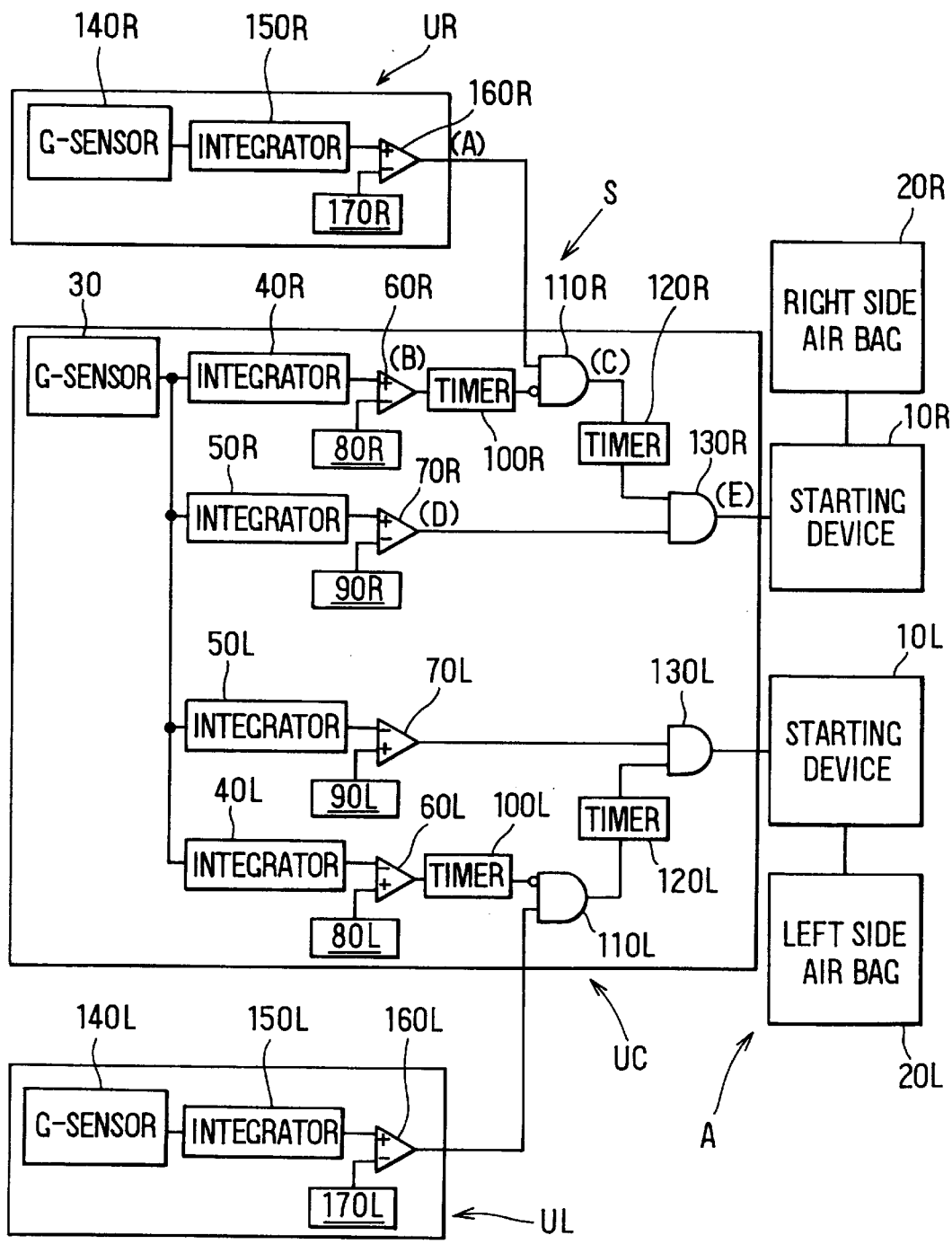
FIG. 1 is an electrical circuit diagram showing a first preferred embodiment of the present invention.

FIG. 1 is an electrical circuit diagram showing a first preferred embodiment of a crash determination device S applied to a car side impact air bag system A.

The air bag system A is made up of starting devices 10R, 10L and a right side (driver's side) air bag 20R and a left side (passenger's side) air bag 20L respectively unfolded by starting operations of these starting devices 10R, 10L. The two air bags 20R, 20L protect passengers seated in a driver's seat and a passenger's seat of the car from right side crashes and left side crashes to the car.

Figure 2:
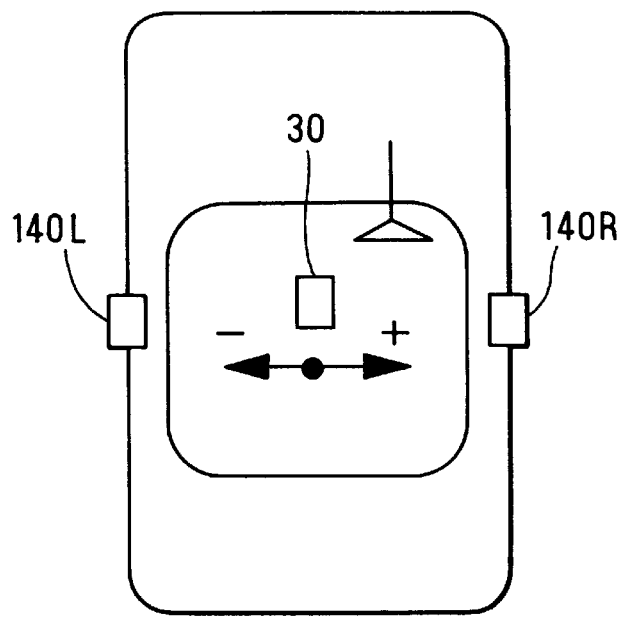
FIG. 2 is a plan view showing mounting locations in a car of G-sensors of FIG. 1.

The crash determination device S has a center unit UC and a right side satellite unit UR and a left side satellite unit UL. The center unit UC has an acceleration sensor 30. As shown in FIG. 2 this acceleration sensor 30 is disposed in the floor of the passenger compartment of the car so as to be positioned in the center of the car. Hereinafter, acceleration sensors will be called G-sensors. The G-sensor 30 does not have to be disposed in the floor of the passenger compartment as described above and may be mounted anywhere in the middle of the car. The G-sensor 30 detects and outputs as an acceleration signal an acceleration occurring at the time of a crash between the left side or the right side of the car and an obstruction such as another car. This G-sensor 30 is so installed that it detects an acceleration occurring as a result of a collision between the right side of the car and an obstruction as a positive value and detects an acceleration occurring as a result of a collision between the left side of the car and an obstruction as a negative value.

The center unit UC has four integrators 40R, 40L, 50R, 50L. These integrators 40R, 40L, 50R, 50L each integrate the level of the output signal of the G-sensor 30 with respect to time and thereby produce an integral output. The integrators 40R, 40L, 50R, 50L repeat an integration over a integral time period equivalent to an integration range sufficient for crash determination every time this integral time period elapses. The integrating functions of the two integrators 40R, 40L are both the same and the integrating functions of the two integrators 50R, 50L are both the same. However, the integrating functions of the two integrators 40R, 50R need not be the same and the integrating functions of the two integrators 40L, 50L need not be the same.

The center unit UC also has four comparators 60R, 70R, 60L, 70L. The comparator 60R produces a high-level comparison output when the integral output of the integrator 40R is higher than the set threshold value of a threshold value setter 80R. This comparison output becomes low-level when the integral output of the integrator 40R is equal to or lower than the set threshold value of the threshold value setter 80R. The comparator 70R produces a high-level comparison output when the integral output of the integrator 50R is higher than the set threshold value of a threshold value setter 90R. This comparison output becomes low-level when the integral output of the integrator 50R is equal to or lower than the set threshold value of the threshold value setter 90R. The comparator 60L produces a high-level comparison output when the integral output of the integrator 40L is lower than the set threshold value of a threshold value setter 80L. This comparison output becomes low-level when the integral output of the integrator 40L is equal to or greater than the set threshold value of the threshold value setter 80L. The comparator 70L produces a high-level comparison output when the integral output of the integrator 50L is lower than the set threshold value of a threshold value setter 90L. This comparison output becomes low-level when the integral output of the integrator 50L is equal to or greater than the set threshold value of the threshold value setter 90L.

The set threshold values of the threshold value setters 80R, 90R, 80L, 90L are lower than a minimum integral value of an acceleration occurring as a result of a collision of the car with an obstruction necessitating air bag deployment.

The center unit UC has retrigger-type timers 100R, 100L, AND gates 110R, 110L and retrigger-type timers 120R, 120L fulfilling the role of phase determining device. The timer 100R measures time elapsing after a rise of the comparison output of the comparator 60R and produces a high-level timing output during this time measuring operation. The timer 100L measures time elapsing after a rise of the comparison output of the comparator 60L and produces a high-level timing output during this time measuring operation. The timing outputs of the timers 100R, 100L are low-level before the start of the time measuring operation. The timers 100R, 100L have a time measuring period greater than the time taken for impact phenomena to end when the car has crashed.

The AND gate 110R inputs the timing output of the timer 100R inverted to negative logic and inputs the output of the right side satellite unit UR as positive logic. When the two inputs to the AND gate 110R are both high-level the AND gate 110R produces a high-level gate output. This gate output becomes low-level when either of the two inputs to the AND gate 110R is low-level. The AND gate 110L inputs the timing output of the timer 100L inverted to negative logic and inputs the output of the left side satellite unit UL as positive logic. When the two inputs to the AND gate 110L are both high-level the AND gate 110L produces a high-level gate output. This gate output becomes low-level when either of the two inputs to the AND gate 110L is low-level.

When the output signal of the AND gate 110R or the AND gate 110L is low-level, the output signal of the G-sensor 30 is leading in phase with respect to the output signal of the G-sensor 140R or the G-sensor 140L. Conversely, when the gate output of the AND gate 110R or the AND gate 110L is high-level, the output signal of the G-sensor 30 is lagging in phase with respect to the output signal of the G-sensor 140R or the G-sensor 140L.

A timer 120R measures time elapsing after a rise of the gate output of the AND gate 110R and produces a high-level timing output during this time measuring operation. The timer 120L measures time elapsing after a rise of the gate output of the AND gate 110L and produces a high-level timing output during this time measuring operation. The timing outputs of the timers 120R, 120L are low-level before the start of the time measuring operation. Also, these timers 120R, 120L restart the time measuring operation on the basis of a rise in their input level. The time measuring period of the timers 120R, 120L is shorter than that of the timers 100R, 100L and also is set so that their time measuring operation continues at least until the comparators 70R, 70L output a high-level signal when a crash in which air bag deployment is necessary occurs. When this time measuring period elapses, the outputs of the timers 120R, 120L become low-level.

The center unit UC also has AND gates 130R, 130L. The AND gate 130R produces a high-level gate output when the output levels of the comparator 70R and the timer 120R are both high. This gate output becomes low-level when the level of either of the two inputs to the AND gate 130R is low. The AND gate 130L produces a high-level gate output when the output levels of the comparator 70L and the timer 120L are both high. This gate output become low-level when either of the two inputs to the AND gate 130L is low.

When the gate output of the AND gate 130R is high-level a starting condition of the starting device 10R is satisfied. Also, when the gate output of the AND gate 130L is high-level a starting condition of the starting device 10L is satisfied. When the gate outputs of both of the AND gates 130R, 130L are low-level, starting of the starting devices 10R, 10L is prohibited.

The right side satellite unit UR has the G-sensor 140R, and as shown in FIG. 2 this G-sensor 140R is installed in the vicinity of a center pillar in the middle of the right side of the car. This G-sensor 140R detects an acceleration resulting from a collision between the right side of the car including this center pillar vicinity and an obstruction and outputs a corresponding acceleration signal.

The right side satellite unit UR also has an integrator 150R, and this integrator 150R integrates the output signal of the G-sensor 140R to produce an integral output. The G-sensor 140R does not have to be installed merely in the vicinity of the center pillar of the right side of the car and may be installed in the center pillar itself.

The right side satellite unit UR also has a comparator 160R and a threshold value setter 170R. When the integral output of the integrator 150R is higher than the set threshold value of the threshold value setter 170R, this comparator 160R produces a high-level comparison output. This comparison output becomes low-level when the integral output of the integrator 150R is equal to or lower than the set threshold value of the threshold value setter 170R.

The left side satellite unit UL has the G-sensor 140L, and as shown in FIG. 2 this G-sensor 140L is installed in the vicinity of a center pillar in the middle of the left side of the car. This G-sensor 140L detects an acceleration resulting from a collision between the left side of the car including this center pillar vicinity and an obstruction and outputs an acceleration signal. The G-sensor 140L does not have to be installed merely in the vicinity of the center pillar of the left side of the car and may be installed in the center pillar itself.

The left side satellite unit UL also has an integrator 150L, and this integrator 150L integrates the output signal of the G-sensor 140R to produce an integral output.

The left side satellite unit UL also has a comparator 160L and a threshold value setter 170L. When the integral output of the integrator 150L is higher than the set threshold value of the threshold value setter 170L, this comparator 160L produces a high-level comparison output. This comparison output becomes low-level when the integral output of the integrator 150L is equal to or lower than the set threshold value of the threshold value setter 170L.

Figure 10A:
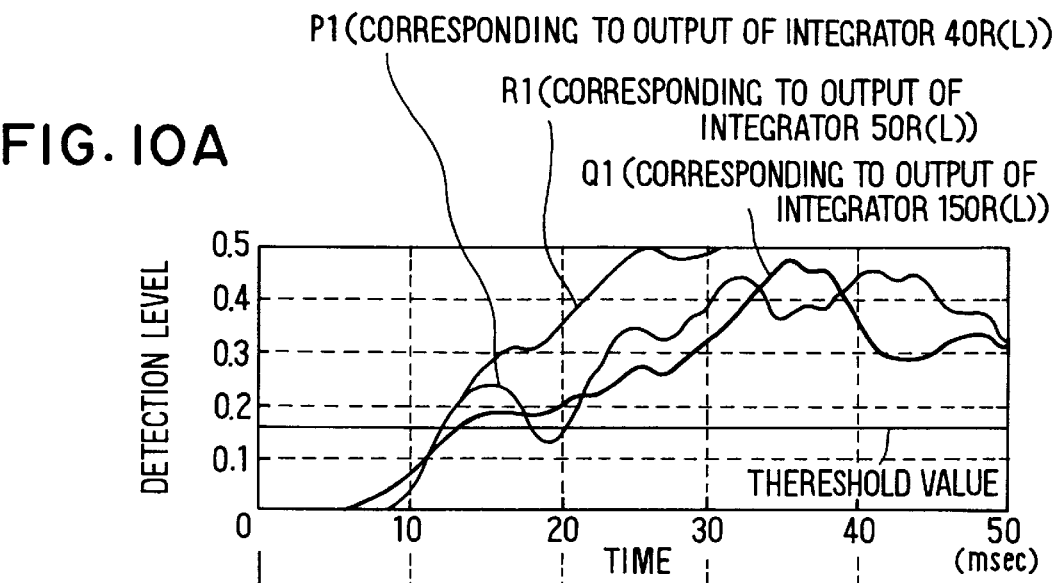
FIG. 10A is a timing chart showing change with time in detection signals of a central acceleration sensor and a side acceleration sensor in the case of the low-speed crash illustrated in FIG. 9.
Figure 12A:
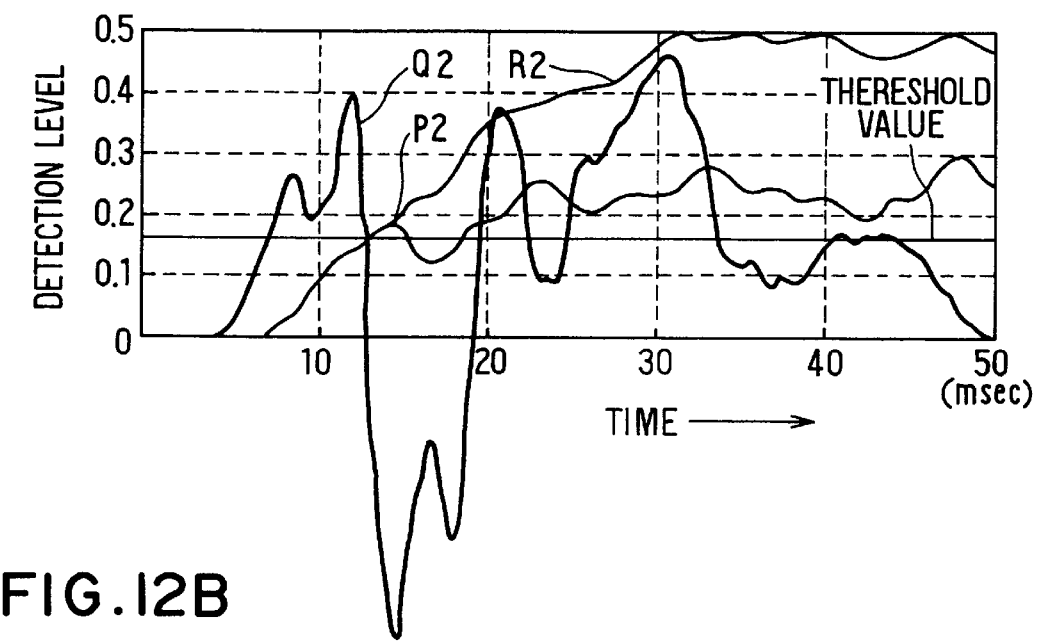
FIG. 12A is a timing chart showing change with time in detection signals of a central acceleration sensor and a side acceleration sensor in the case of the high-speed crash illustrated in FIG. 11.

The set threshold values (see FIG. 10A, FIG. 12A) of the threshold value setters 170R, 170L of the two satellite units UL, UR are values lower than a minimum integral value of an acceleration occurring as a result of a collision of the car with an obstruction necessitating air bag deployment but are set higher than the set threshold values of the threshold value setters of the center unit UC.

This setting is to ensure that, even if at the time of a low-speed impact to a side of the car this impact is transmitted to the G-sensor 140R or 140L somewhat more quickly than to the G-sensor 30, the timing of the rise of the comparison output of the comparators 60R, 70R or 60L, 70L is still somewhat earlier than the timing of the rise of the comparison output of the comparator 160R or 160L. It is to be noted that the integrating functions of the two integrators 150R, 150L are the same as the integrating functions of the integrators 40R, 40L.

It will now be supposed that in this first preferred embodiment constructed as described above another car has crashed at low speed into the vicinity where the G-sensor 140R is installed of the right side of the present car. In this case, because the rigidity of the car in the vicinity where the G-sensor 140R is installed is high, there is almost no difference in the time taken for the impact to be transmitted from the impact location in the right side of the car to the two G-sensors 140R, 30. Therefore, accelerations based on this impact are detected by the two G-sensors 140R, 30 as acceleration signals either substantially simultaneously or in close succession. Together with this, either substantially simultaneously with or in close succession with the two integrators 40R, 50R starting to integrate the output signal of the G-sensor 30, the integrator 150R starts to integrate the output signal of the G-sensor 140R.

The integrating functions of the integrators 40R, 150R are both the same. Therefore, when the integration starting time of the integrator 40R is somewhat earlier than the integration starting time of the integrator 150R, the time at which the two comparators 60R, 70R produce a high-level comparison output is earlier than the time at which the comparator 160R produces a high-level comparison output (see (A), (B) and (D) in FIG. 1 and FIG. 10B).

Also, the set threshold value of the threshold value setter 80R is lower than the set threshold value of the threshold value setter 170R, as mentioned above. Therefore, even if the integration starting time of the integrator 40R is somewhat later than the integration starting time of the integrator 150R, the time at which the comparator 60R produces a high-level comparison output is still earlier than the time at which the comparator 160R produces a high-level comparison output. Because of this, the timer 100R starts the time measuring operation and produces a high-level timing output before the comparator 160R produces a high-level comparison output. Therefore, the outputs of the AND gate 100R and the timer 120R are still low-level (see (C) in FIG. 1 and FIG. 10B).

Figure 10B:
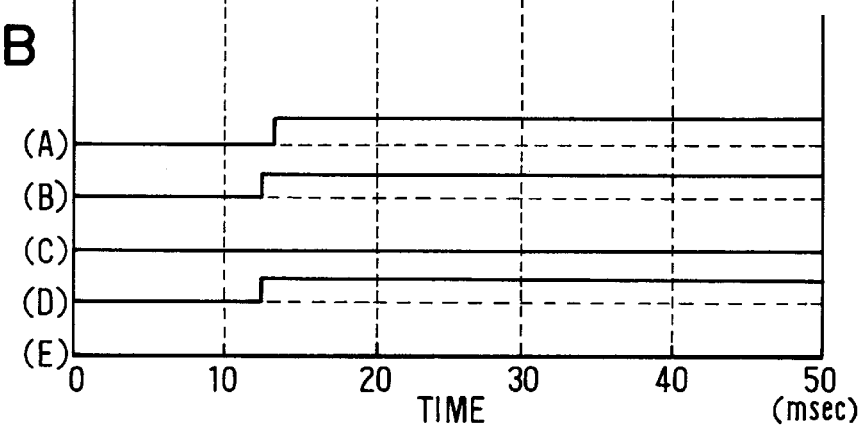
FIG. 10B is a timing chart showing output waveforms of main constituent devices in the first preferred embodiment in the case of the low-speed crash illustrated in FIG. 9.
Figure 11:
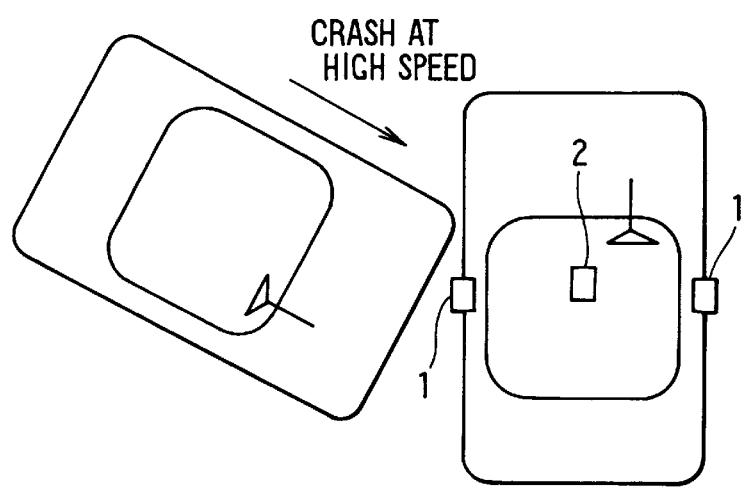
FIG. 11 is a plan view illustrating another car crashing at high speed into the left side of the present car from diagonally in front.

Consequently, even when the comparison output of the comparator 70R becomes high-level, the gate output of the AND gate 130R is kept low-level (see (E) in FIG. 1 and FIG. 10(B)). Because of this, starting operation of the starting device 10R is prohibited. As a result, in cases like the low-speed crash described above wherein operation of the air bag system A is not necessary, the starting device 10R does not operate.

Also when the right side front wheel of the car has mounted a curb and the accompanying impact is transmitted to the G-sensor 140R somewhat more quickly than to the G-sensor 30, in the same way as that described above the time at which the comparator 60R produces a high-level comparison output is earlier than the time at which the comparator 160R produces a high-level comparison output. As a result, the air bag system A does not operate erroneously.

The effect described above is also achieved when another car crashes at low speed into the vicinity where the G-sensor 140L is installed of the left side of the present car and when the left side front wheel of the car has mounted a curb. When another car crashes at high speed into the G-sensor vicinity of the left side or of the right side of the present car, the starting device 10R or the starting device 10L is started on the basis of the output of the respective G-sensor by another logic circuit.

Next, it will be supposed that another car has crashed at high speed into a right side door of the present car diagonally from the front. In this case, the rigidity of the right side door of the present car is low compared with the vicinity where the G-sensor 140R is installed. Consequently, the impact of the high speed collision is transmitted to the G-sensor 140R considerably more quickly than to the G-sensor 30. Therefore, the acceleration due to this impact is detected considerably earlier by the G-sensor 140R than by the G-sensor 30. Along with this, the time at which the integrator 150R starts to integrate the level of the output signal of the G-sensor 140R is considerably earlier than the time at which the integrators 40R, 50R start to integrate the output signal of the G-sensor 30. Consequently, although the integrating functions of the integrators 40R, 150R are both the same and the set threshold value of the threshold value setter 80R is lower than the set threshold value of the threshold value setter 170R as mentioned above, the time at which the comparator 60R produces a high-level comparison output is considerably earlier than the time at which the comparator 60R produces a high-level comparison output (see (A), (B) and (D) in FIG. 1 and FIG. 12B).

Consequently, the comparator 160R produces a high-level comparison output before the timer 100R starts the time measuring operation. At this time, the output of the timer 100R is still low-level. Therefore, the AND gate 110R, as shown by the symbol (C) in FIG. 1 and FIG. 12B, produces a high-level gate output at the same time as the comparator 160R produces a high-level comparison output, and in response to this the timer 120R starts the time measuring operation and produces a high-level timing output. After that, even if the timer 100R produces a high-level timing signal, because the timer 120R is retrigger-type it continues the time measuring operation.

Figure 12B:
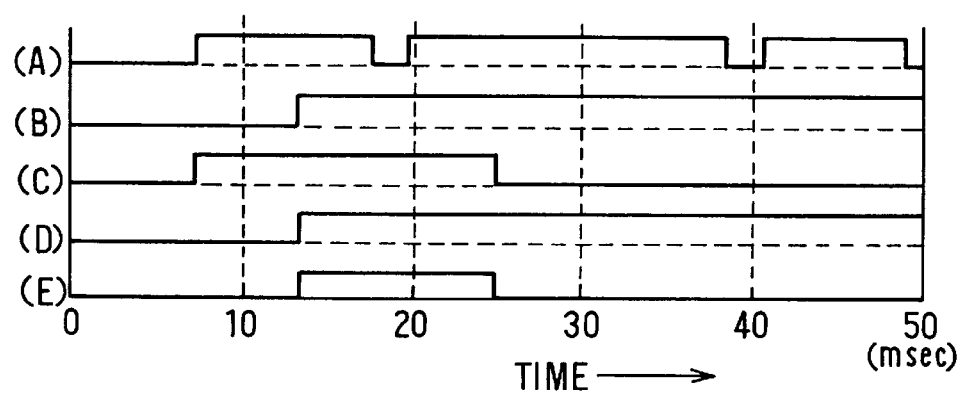
FIG. 12B is a timing chart showing output waveforms of main constituent devices in the first preferred embodiment in the case of the high-speed crash illustrated in FIG. 11.

Therefore, when the comparator 70R produces a high-level comparison output while the timer 120R carries out the time measuring operation, the AND gate 130R produces a high-level gate output (see the symbol (E) in FIG. 1 and FIG. 12B). As a result, in the air bag system A, the starting device 10R is activated by this high-level gate output and operates the air bag 20R.

The effect described above can also be achieved in the same way when another car crashes into a right side door of the present car diagonally from the rear and when another car collides with a left side door diagonally from the front or from the rear.

As described above, according to this first preferred embodiment, when the time at which an impact is transmitted to the G-sensor 30 is earlier than the time at which it is transmitted to one or the other of the two G-sensors 140R, 140L, by the impact being regarded as one which does not call for operation of the air bag system A and starting of one of the two starting devices 10R, 10L being prohibited, erroneous operation of the air bag system A is prevented.

Also, even if an impact like tapping a side of the car with a bat or the like (a so-called hammering impact) occurs at a side, or if an impact arising when a door of the car is slammed shut occurs (a so-called door slam impact) at a side, these impacts are not readily transmitted to the G-sensor 30. In the center unit UC, the outputs of the timer 120R and the comparator 70R are logically multiplied by the AND gate 130R and the outputs of the timer 120L and the comparator 70L are logically multiplied by the AND gate 130L. Consequently, because the AND gate 130R or the AND gate 130L keeps its gate output at a low level on the basis of this logical multiplication, the starting devices 10 do not start erroneously due to an impact caused by hammering or door slamming.

Figure 3:
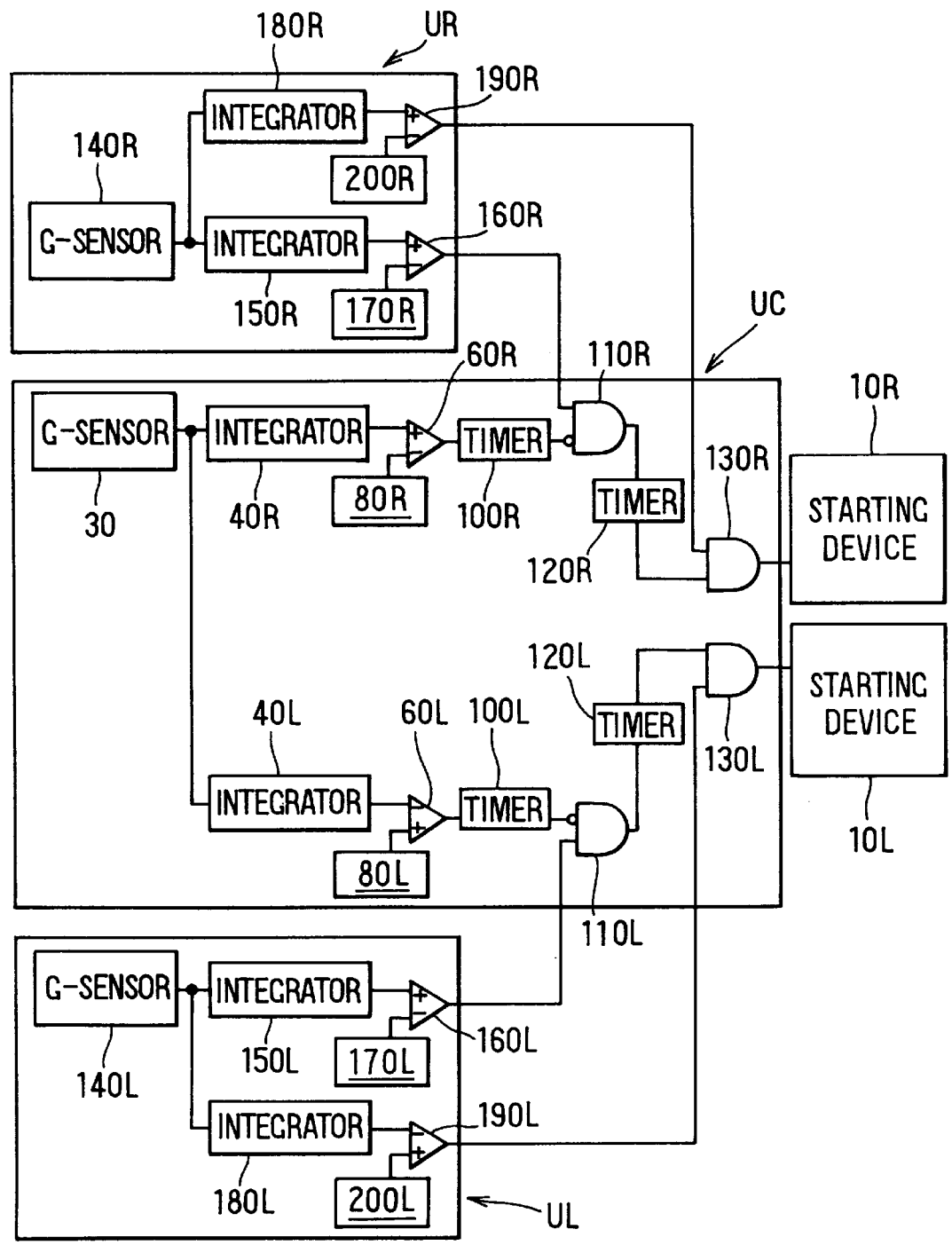
FIG. 3 is an electrical circuit diagram showing a main part of a modified version of the first preferred embodiment.
Figure 4:
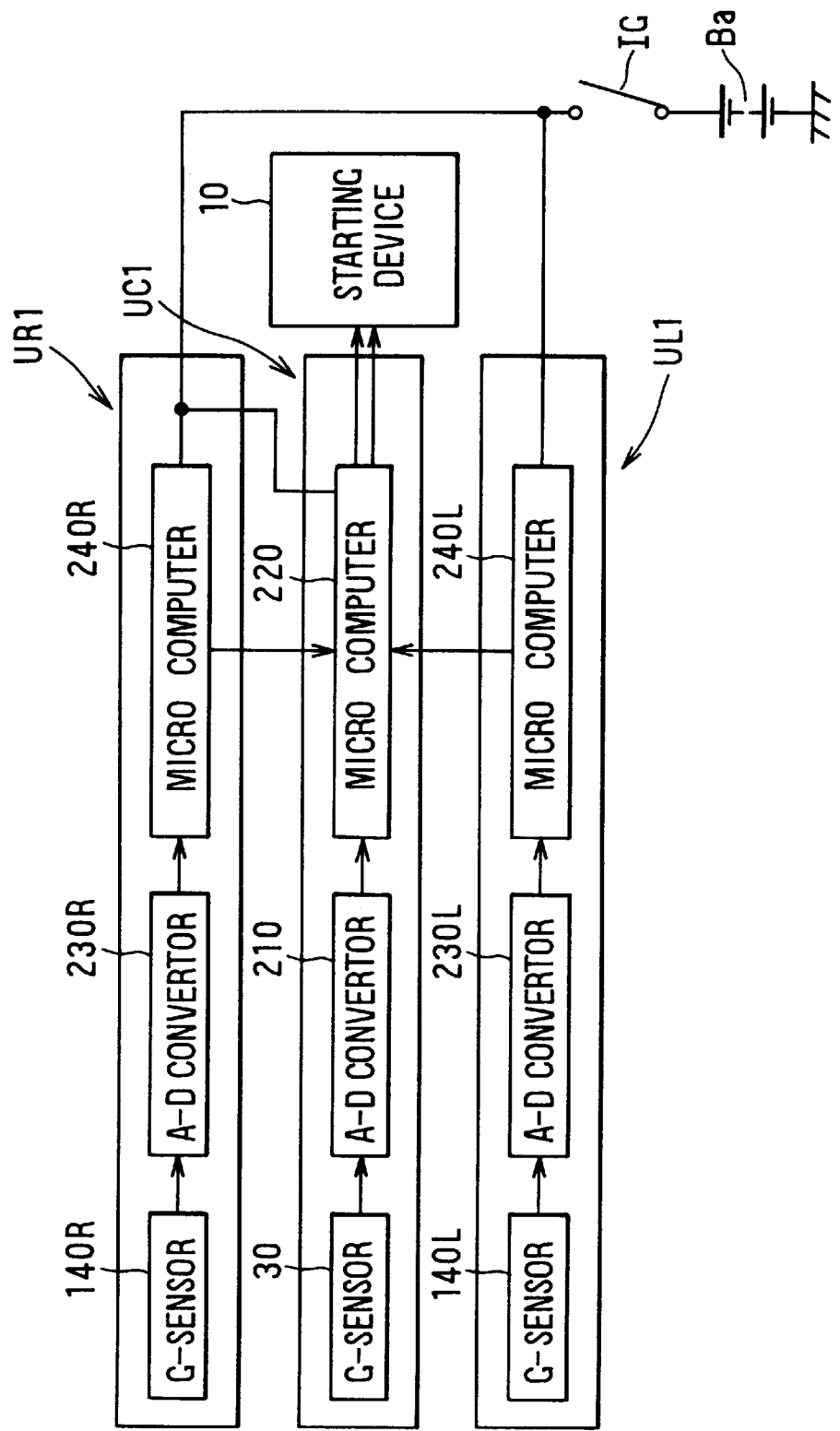
FIG. 4 is a block circuit diagram showing a second preferred embodiment of the invention.

FIG. 3 shows a main part of a modified version of the first preferred embodiment described above.

In this modified version, in a center unit UC according to the first preferred embodiment described above, the two integrators 50R, 50L, the two comparators 70R, 70L and the two threshold value setters 90R, 90L are dispensed with. Also, in the right side satellite unit UR, an integrator 180R, a comparator 190R and a threshold value setter 200R are added and in the left side satellite unit UL an integrator 180L, a comparator 190L and a threshold value setter 200L are added.

The integrator 180R integrates the detection signal of the G-sensor 140R. The comparator 180R produces and outputs to the AND gate 130R a high-level comparison output when the integral output of the integrator 180R is higher than the set threshold value of the threshold value setter 200R. When the integral output of the integrator 180R is equal to or lower than the set threshold value of the threshold value setter 200R, this comparison output becomes low-level. The integrating function of the integrator 180R is different from the integrating function of the integrator 150R, and the set threshold value of the threshold value setter 200R is different from the set threshold value of the threshold value setter 170R.

The integrator 180L integrates the detection signal of the G-sensor 140L. The comparator 180L produces and outputs to the AND gate 130L a high-level comparison output when the integral output of the integrator 180L is higher than the set threshold value of the threshold value setter 200L. When the integral output of the integrator 180L is equal to or lower than the set threshold value of the threshold value setter 200L, this comparison output becomes low-level. The integrating function of the integrator 180L is different from the integrating function of the integrator 150L, and the set threshold value of the threshold value setter 200L is different from the set threshold value of the threshold value setter 170L. The rest of the construction is the same as that of the first preferred embodiment.

In this modified version, when another car collides at high speed into the right side door of the present car, a comparison output of a comparator 70R is not supplied to the AND gate 130R on the basis of the detection signal of the G-sensor 30 as described in the first preferred embodiment but rather a comparison output of the comparator 190R is supplied to the AND gate 130R on the basis of the detection signal of the G-sensor 140R integrated by the integrator 180R.

Since the G-sensor 140R is positioned in the vicinity of the center pillar of the right side of the car, the impact of the above-mentioned crash is transmitted to the G-sensor 140R earlier than to the G-sensor 30.

Therefore, the time at which the AND gate 130R produces a high-level gate output is earlier than in the case of the first preferred embodiment. As a result, the determination of the activating of the starting device 10R is earlier compared to the case of the first preferred embodiment. The other effects of this modified version are the same as those of the first preferred embodiment.

(Second Preferred Embodiment)

A second preferred embodiment of the invention will now be described with reference to FIG. 4 through FIG. 8.

In this second preferred embodiment, instead of the center unit UC and the two satellite units UL, UR described in the first preferred embodiment, a center unit UC1 and left and right satellite units UL1, UR1 are employed.

The center unit UC1 has a G-sensor 30 the same as that employed in the center unit UC of the first preferred embodiment, an A-D convertor 210 and a microcomputer 220.

The A-D convertor 210 converts the detection signal of the G-sensor 30 into digital acceleration data. The microcomputer 220 executes a center side computer program according to a flow chart shown in FIG. 5 and FIG. 6. During this execution, microcomputer 220 performs processing required for control of a starting device 10 according to the output of one or the other of the two satellite units UL1, UR1.

The satellite unit UR1 has a G-sensor 140R the same as that employed in the right side satellite unit UR of the first preferred embodiment, an A-D convertor 230R and a microcomputer 240R. The A-D convertor 230R converts the detection signal of the G-sensor 140R into digital acceleration data. The microcomputer 240R executes a right side computer program according to a flow chart shown in FIG. 7, and during this execution performs processing required for output control to the center unit UC1.

The satellite unit UL1 has a G-sensor 140L the same as that employed in the left side satellite unit UL of the first preferred embodiment, an A-D convertor 230L and a microcomputer 240L. The A-D convertor 230L converts the detection signal of the G-sensor 140L into digital acceleration data. The microcomputer 240L executes a left side computer program according to a flow chart shown in FIG. 8 and during this execution performs processing required for output control to the center unit UC1. The microcomputers 220, 240R and 240L are supplied with power from a battery Ba mounted in the car by way of an ignition switch IG. The functions of the A-D convertors 210, 230R and 230L are all the same. The rest of the construction is the same as that of the first preferred embodiment described above.

In this second preferred embodiment, the microcomputers 220, 240R and 240L all start to execute their respective programs simultaneously when the ignition switch IG is operated.

It will now be supposed that in this state another car crashes at low speed into the vicinity of the right side of the present car where the G-sensor 140R is mounted. When this happens, an acceleration resulting from this crash is detected by each of the two G-sensors 30, 140R as an acceleration signal either substantially simultaneously or in close succession, in the same way as in the first preferred embodiment. These acceleration signals are respectively converted into digital acceleration data by the two A-D convertors 210, 230R.

Figure 7:
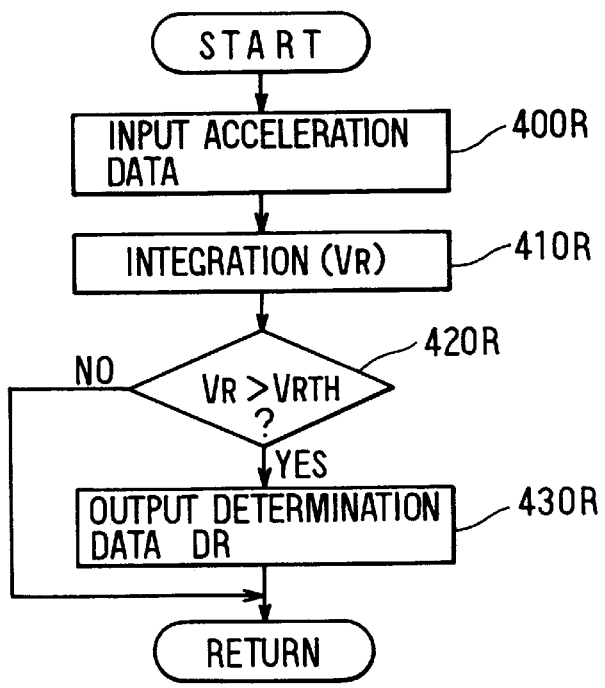
FIG. 7 is a flow chart showing the operation of a microcomputer of a satellite unit UR1 of FIG. 4.
Figure 5:
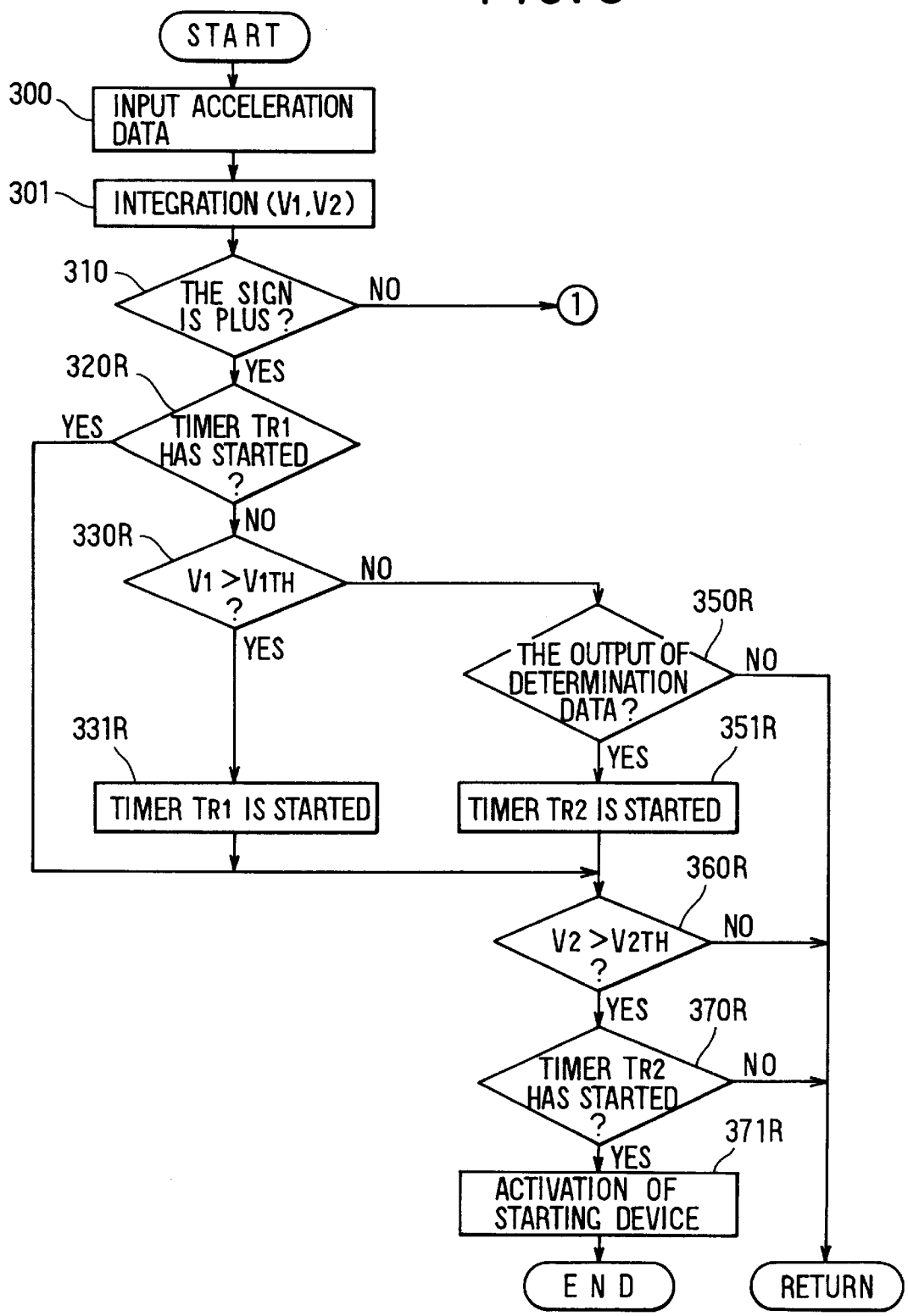
FIG. 5 is part of a flow chart showing the operation of a microcomputer of a center unit UC1 shown in FIG. 4.
Figure 6:
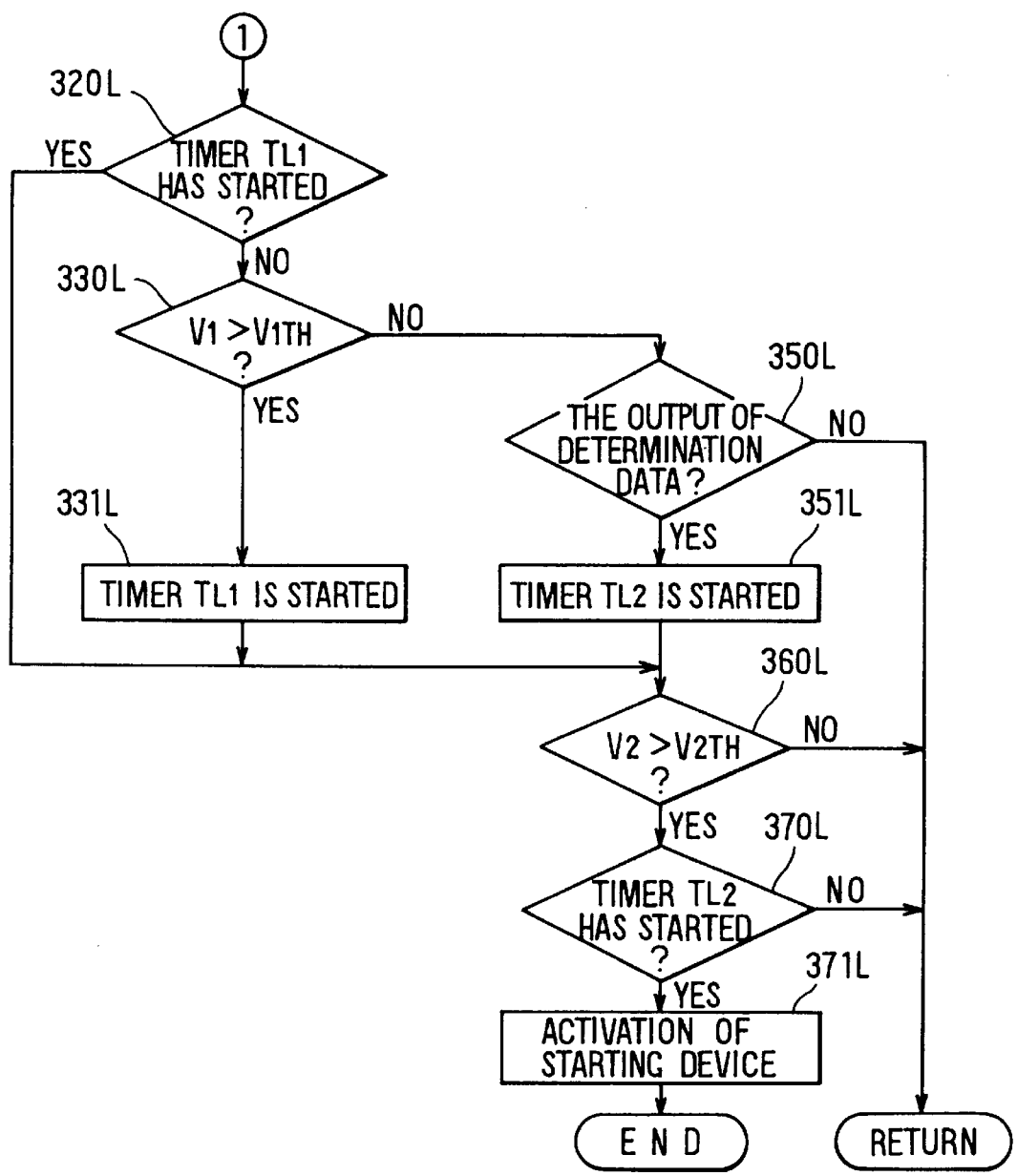
FIG. 6 is another part of the same flow chart.

In the two microcomputers 220, 240R, according to the flow charts of FIGS. 5 and 6 and of FIG. 7, the following processing is carried out.

First, in steps 300 and 400R (see FIG. 5 and FIG. 7), the acceleration data of each of the two A-D convertors 210, 230R are inputted into the microcomputers 220, 240R as output data with a plus or minus sign assigned thereto either substantially simultaneously or in close succession.

In step 301 (see FIG. 5), integration to compute an integral value $V_1$ of the output data of the A-D convertor 210 is started. This means that the integral value $V_1$ is rising. Simultaneously or in close succession with this, in step 410R (see FIG. 7), integration to compute an integral value $V_R$ of the output data of the A-D convertor 230R is started. This means that the integral value $V_R$ is also rising.

In step 420R (see FIG. 7), if the integral value $V_R$ is greater than a threshold value $V_{RTH}$ (the same as the set threshold value of the threshold value setter 170R), a YES determination is made. Then, in step 430R, this determination result is outputted to the microcomputer 220 as determination data DR.

When another car crashes into the right side of the present car, because the sign of the detection signal of the G-sensor 30 is plus, the output data of the A-D convertor 210 has a positive value. Therefore, in step 310 (see FIG. 5), a YES determination is made.

Also, at this stage, since a timer $T_{R1}$ built into the microcomputer 220 has not yet started, the determination in step 320R (see FIG. 5) is NO. If the integral value $V_1$ is greater than a threshold value $V_{1TH}$ (equal to the set threshold value of the threshold value setter 80R), the determination in step 330R is YES. Consequently, in step 331R, the timer $T_{R1}$ is started to start the time measuring operation. Therefore, thereafter, the determination made in step 320R is YES.

The integration processing speeds of the microcomputers 220, 240R are different, but the comparison times of the integral outputs are synchronized. Therefore, when the time at which the integral output rises in step 301 is somewhat earlier than the time at which the integral output rises in step 410R, the time at which a YES determination is made in step 330R is earlier than the time at which a YES determination is made in step 420R.

Also, the threshold value $V_{1TH}$ is lower than the threshold value $V_{RTH}$. Consequently, even when the time at which the integral output rises in step 301 is somewhat later than the time at which the integral output rises in step 410R, the time at which a YES determination is made in step 330R is still earlier than the time at which a YES determination is made in step 420R.

Therefore, the timer $T_{R1}$ starts the time measuring operation before the YES determination is made in step 420R. Consequently, even if the determination in step 360R, which will be further discussed later, is YES, the determination in step 370R is NO. Consequently, starting of the starting device 10 is prohibited. As a result, in the case of a crash (impact) not necessitating operation of the air bag system A, such as a low-speed crash, the air bag 20R does not operate.

When the right side front wheel of the car mounts a curb and that impact is transmitted to the G-sensor 30 somewhat more quickly than to the G-sensor 140R, as described above the time of the YES determination in step 330R is earlier than the time of the YES determination in step 420R. As a result, the air bag system A does not operate erroneously.

Next, suppose that another car crashes at high speed into a right side door of the present car diagonally from the front. In this case, as in the first preferred embodiment, the impact of the high-speed crash is transmitted to the G-sensor 140R more quickly than to the G-sensor 30. Therefore, the time of detection by the G-sensor 140R of the acceleration resulting from this impact as an acceleration signal is considerably earlier than the time of its detection by the G-sensor 30. Along with this, the time at which the integral output rises in step 410R is considerably earlier than the time at which the integral output rises in step 301R. Therefore, even if the threshold value $V_{1TH}$ is has been made lower than the threshold value $V_{RTH}$ (the same as the set threshold value of the threshold value setter 170R), the time of the YES determination in step 420R is considerably earlier than the time of the YES determination in step 330R. Consequently, the YES determination in step 420R is made before the timer $T_{R1}$ starts the time measuring operation. Therefore, the YES determination in step 350R is made simultaneously with the YES determination in step 420R. When in step 350R a YES determination is made, in step 351R a timer $T_{R2}$ is started and this timer $T_{R2}$ carries out a time measuring operation for a predetermined time only. When during the time measuring operation of this timer $T_{R2}$ the integral value $V_2$ of the G-sensor 30 becomes larger than the threshold value $V_{2TH}$ for determining that the car is in a right side crash, the determination of step 360R becomes YES. At this time, because the timer $T_{R2}$ has been started (it is in the process of time measuring), a YES determination is made in step 370R also.

Accordingly, in step 371R the starting device 10 is started, and in the air bag system A the air bag 20R is operated by the activation of the starting device 10. The threshold value $V_{1TH}$ may be set lower than the threshold value $V_{2TH}$ or may be set to the same value as the threshold value $V_{2TH}$.

Figure 8:
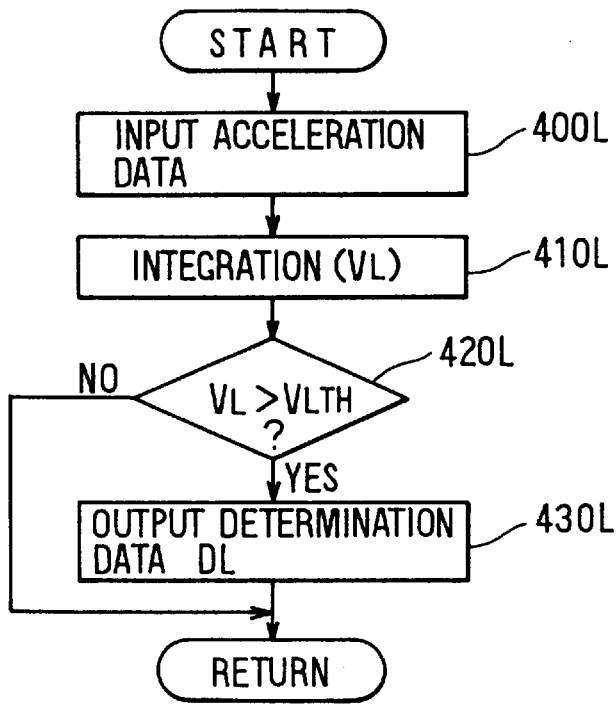
FIG. 8 is a flow chart showing the operation of a microcomputer of a satellite unit UL1 of FIG. 4.
Figure 9:
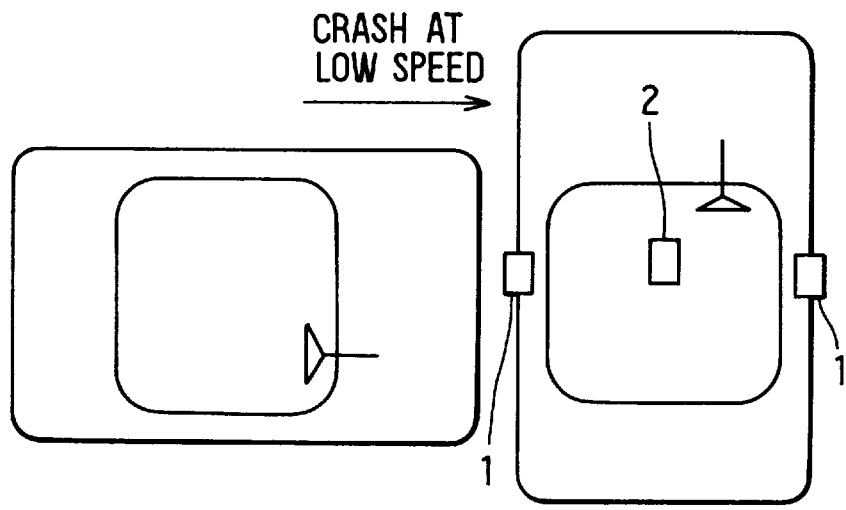
FIG. 9 is a plan view illustrating another car crashing at low speed into the left side of the present car.

The effects described above can also be achieved in the same way according to the flow charts of FIG. 6 and FIG. 8 when another car crashes at low speed into the vicinity of the left side of the present car where the G-sensor 140L is mounted and when the left side front wheel of the present car mounts a curb and when another car crashes at high speed into a left side door of the present car diagonally from the front.

In this case, steps 320L through 371L in the flow chart of FIG. 6 respectively correspond with steps 320R through 371R in the flow chart of FIG. 5. Also, steps 400L through 430L in the flow chart of FIG. 8 respectively correspond with steps 400R through 430R in the flow chart of FIG. 7.

As described above, also with a construction in which microcomputers are employed as in this second preferred embodiment, as in the first preferred embodiment described above, when the time at which an impact is transmitted to the G-sensor 30 is earlier than the time at which it is transmitted to one or the other of the two G-sensors 140R, 140L, by the impact being regarded as one which does not call for operation of the air bag system A and activating of the starting device 10 being prohibited, erroneous operation of the air bag system A can be prevented. The other effects are the same as those of the first preferred embodiment.

In the preferred embodiments described above, examples of the invention applied to a side impact air bag system for a car were described; however, the invention is not limited to this application and may also be applied to other passenger protection systems such as car seat belt tensioners and door-locking systems.

In this case, a door-locking system would be constructed to automatically unlock door locks in the event of a car crash. Also, the invention is not limited to cars and may be applied to passenger protection systems of all types of vehicles.

Also, in practicing the invention, instead of the G-sensor 30, a pair of G-sensors may be employed and the output of one of this pair of G-sensors inputted into the two integrators 40R, 50R and the output of the other G-sensor inputted into the two integrators 40L, 50L.

In this case, the outputs of the integrator 40L and the threshold value setter 80L are inputted respectively into the plus side and minus side input terminals of the comparator 60L, and similarly the outputs of the integrator 50L and the threshold value setter 80L are inputted respectively into the plus side and minus side input terminals of the comparator 70L.

Also, in practicing the invention, if, in a case wherein another car crashes at low speed into a side of the present car, even when the impact is transmitted to the G-sensor 30 somewhat more quickly than to the G-sensor 140R or the G-sensor 140L the transmission of the signal to the integrators from the G-sensor 30 is delayed more than the signal transmission from the G-sensor 140R or the G-sensor 140L to its integrator due to floating capacitances of circuit devices and interconnections and the like, the above-mentioned threshold values can be made the same in the center unit as they are in the satellite units.

Also, in practicing the invention, a construction may be adopted wherein at a time of a lagging phase determination, instead of operation of the air bag system A being prohibited, control is carried out to switch the threshold values of the threshold value setter 90R (or 90L) and 200R (or 200L) to values such that they will not be exceeded in an impact not necessitating operation of the air bag system A (for example raising the threshold values).

Also, in practicing the invention, a construction may be adopted wherein, after it is determined whether the integral output of the integrator 150R is leading or lagging the integral output of the integrator 40R or 50R in phase, when it is determined to be leading in phase, the impact is determined to be a high-speed crash on the right side of the car on the basis of at least one of the integral output of the integrator 150R and the integral output of the integrator 40R or the integrator 50R, and when on the other hand it is determined to be lagging in phase the impact is determined to be a low-speed crash with an obstruction on the right side of the car on the basis of at least one of the integral output of the integrator 150R and the integral output of the integrator 40R or the integrator 50R. And similarly after it is determined whether the integral output of the integrator 150L is leading or lagging the integral output of the integrator 40L or 50L in phase, when it is determined to be leading in phase, the impact is determined to be a high-speed crash on the left side of the car on the basis of at least one of the integral output of the integrator 150L and the integral output of the integrator 40L or the integrator 50L, and when on the other hand it is determined to be lagging in phase the impact is determined to be a low-speed crash with an obstruction on the left side of the car on the basis of at least one of the integral output of the integrator 150L and the integral output of the integrator 40L or the integrator 50L.

By this means also it is possible to achieve the same effects as those of the preferred embodiments described above.

What is claimed is:

1. A side crash determining device provided in a side impact passenger protection system installed in a vehicle to operate the side impact passenger protection system, comprising:

first acceleration sensors mounted in the vicinities of high-rigidity parts of the sides of the vehicle for detecting as an acceleration a crash between either of the vehicle sides and an obstruction;

a second acceleration sensor mounted in a central part of a body of the vehicle for detecting as an acceleration a crash between either of the vehicle sides and an obstruction;

an integrating device for integrating and outputting as first and second integral outputs respectively detected accelerations of one of the first acceleration sensors and the second acceleration sensor;

a phase determining device for when the first and second integral outputs have been outputted from the integrating device according to integration of said detected accelerations in predetermined integration periods determining whether the first integral output is leading in phase or lagging in phase with respect to the second integral output; and a crash determining device for when the phase determining device determines the first integral output to be leading in phase determining on the basis of at least one of the first and second integral outputs that the vehicle is in a high-speed crash between a low-rigidity part of one of the vehicle sides and an obstruction such that it is necessary for the passenger protection system to be operated and when the phase determining device determines the first integral output to be lagging in phase determining on the basis of at least one of the first and second integral outputs that the vehicle is in a low-speed crash between one of the high-rigidity parts and an obstruction such that it is necessary for operation of the passenger protection system to be prohibited.

2. A side crash determining device according to claim 1, wherein the high-rigidity parts include center pillars of the vehicle sides and the crash determining device determines a high-speed crash between a low-rigidity part of either of the vehicle sides and an obstruction as a high-speed crash between a door of the respective vehicle side and an obstruction and determines a low-speed crash between either of the high-rigidity parts and an obstruction as a low-speed crash between one of side parts including the center pillars and an obstruction.

3. A side crash determining device according to claim 1, wherein the phase determining device comprises:

a threshold value setting device for setting threshold values corresponding to the predetermined integration periods;

a comparing device for producing first and second comparison outputs when the first and second integral outputs have exceeded the threshold values;

a first time measuring device which starts time measuring in response to the second comparison output;

a phase determining device for determining that the first integral output is leading in phase when receiving the first comparison output before the first time measuring device starts time measuring and determining that the first integral output is lagging in phase when receiving the first comparison output after the first time measuring device starts time measuring; and a second time measuring device which starts time measuring in response to a determination made by said phase determining device such that the first integral output is leading in phase, and wherein the crash determining device determines the vehicle to be in a low-speed crash when receiving the second comparison output before the second time measuring device starts time measuring and determines the vehicle to be in a high-speed crash when receiving the second comparison output after the second time measuring device starts time measuring.

4. A side crash determining device according to claim 3, wherein the threshold value setting device comprises a first threshold value setter for setting a first threshold value and a second threshold value setter for setting a second threshold value lower than the first threshold value and the comparison device comprises a first comparator for producing the first comparison output when the first integral output exceeds the first threshold value and a second comparator for producing the second comparison output when the second integral output exceeds the second threshold value.

5. A side crash determining device according to claim 1, wherein the crash determining device comprises a logical multiplier gate.

6. A side impact passenger protection system for a vehicle, comprising:

side impact passenger protection mechanisms installed in the left and right sides of a vehicle;

a starting device for starting these side impact passenger protection mechanisms;

first acceleration sensors respectively mounted in the vicinities of high-rigidity parts of left and right sides of the vehicle for at the time of a crash between either of the vehicle sides and an obstruction detecting this crash as an acceleration;

a second acceleration sensor mounted in a central part of a body of the vehicle for at the time of a crash between either of the vehicle sides and an obstruction detecting this crash as an acceleration;

an integrating device for integrating and outputting as first and second integral outputs respectively detected accelerations of one of the first acceleration sensors and the second acceleration sensor;

a phase determining device for when the first and second integral outputs have been outputted from the integrating device according to integration of said detected accelerations in predetermined integration periods determining whether the first integral output is leading in phase or lagging in phase with respect to the second integral output; and a crash determining device for when the determining device determines the first integral output to be leading in phase determining on the basis of at least one of the first and second integral outputs that the vehicle is in a high-speed crash between a low-rigidity part of one of the vehicle sides and an obstruction and sending a starting output to the starting device, and for when the determining device determines the first integral output to be lagging the second integral output in phase determining on the basis of at least one of the first and second integral outputs that the vehicle is in a low-speed crash between one of the high-rigidity parts of the sides and an obstruction and sending a starting prohibiting signal to the starting device.

7. A side impact passenger protection system according to claim 6, wherein the high-rigidity parts include center pillars of the vehicle sides and the crash determining device determines a high-speed crash between a low-rigidity part of either of the vehicle sides and an obstruction as a high-speed crash between a door of the respective vehicle side and an obstruction and determines a low-speed crash between either of the high-rigidity parts and an obstruction as a low-speed crash between one of side parts including the center pillars and an obstruction.

8. A side impact passenger protection system according to claim 6, wherein the phase determining-device comprises:

a threshold value setting device for setting threshold values corresponding to the predetermined integration periods;

a comparing device for producing first and second comparison outputs when the first and second integral outputs have exceeded the threshold values;

a first time measuring device which starts time measuring in response to the second comparison output;

a phase determining device for determining that the first integral output is leading in phase when receiving the first comparison output before the first time measuring device starts time measuring and determining that the first integral output is lagging in phase when receiving the first comparison output after the first time measuring device starts time measuring; and a second time measuring device which starts time measuring in response to a determination made by said phase determining device such that the first integral output is leading in phase, and wherein the crash determining device determines the vehicle to be in a low-speed crash when receiving the second comparison output before the second time measuring device starts time measuring and determines the vehicle to be in a high-speed crash when receiving the second comparison output after the second time measuring device starts time measuring.

9. A side impact passenger protection system according to claim 8, wherein the threshold value setting device comprises a first threshold value setter for setting a first threshold value and a second threshold value setter for setting a second threshold value lower than the first threshold value and the comparison device comprises a first comparator for producing the first comparison output when the first integral output exceeds the first threshold value and a second comparator for producing the second comparison output when the second integral output exceeds the second threshold value.

10. A side impact passenger protection system according to claim 6, wherein the crash determining device comprises a logical multiplier gate.

11. A side crash determining device provided in a side impact passenger protection system installed in a vehicle to operate the side impact passenger protection system, comprising:

first acceleration sensors mounted in the vicinities of high-rigidity parts of the sides of the vehicle for detecting as an acceleration a crash between either of the vehicle sides and an obstruction;

a second acceleration sensor mounted in a central part of a body of the vehicle for detecting as an acceleration a crash between either of the vehicle sides and an obstruction;

an integrating device for integrating and outputting as first and second integral outputs respectively detected accelerations of one of the first acceleration sensors and the second acceleration sensor;

a comparing device for comparing said first integral output with a first threshold value and said second integral output with a second threshold value which is equal to or lower than said first threshold value; and a crash determining device for when said first integral output has reached said first threshold value earlier than said second integral output reaches said second threshold value determining that the vehicle is in a high-speed crash between a low-rigidity part of one of the vehicle sides and an obstruction such that it is necessary for the passenger protection system to be operated.

12. A side crash determining device according to claim 11, wherein said crash determining device determines that the vehicle is in a low-speed crash between a high-rigidity part of one of the vehicle sides and an obstruction such that it is unnecessary for the passenger protection system to be operated when said second integral output has reached said second threshold value earlier than said first integral output reaches said first threshold value.

13. A side crash determining device according to claim 11, wherein said crash determining device determining that the vehicle is in a high-speed crash between a low-rigidity part of one of the vehicle sides and an obstruction when said second integral output has reached said second threshold value within a predetermined time period after said first integral output reaches a third threshold value.

14. A side crash determining device according to claim 13, wherein said third threshold value is equal to or greater than said first threshold value.

15. A side impact passenger protection system for a vehicle, comprising:
   side impact passenger protection mechanisms installed in the left and right sides of a vehicle;
   a starting device for starting these side impact passenger protection mechanisms;
   first acceleration sensors respectively mounted in the vicinities of high-rigidity parts of left and right sides of the vehicle for at the time of a crash between either of the vehicle sides and an obstruction detecting this crash as an acceleration;
   a second acceleration sensor mounted in a central part of a body of the vehicle for at the time of a crash between either of the vehicle sides and an obstruction detecting this crash as an acceleration;
   an integrating device for integrating and outputting as first and second integral outputs respectively detected accelerations of one of the first acceleration sensors and the second acceleration sensor;
   a comparing device for comparing said first integral output with a first threshold value and said second integral output with a second threshold value which is equal to or lower than said first threshold value;
   a crash determining device for when said first integral output has reached said first threshold value earlier than said second integral output reaches said second threshold value determining that the vehicle is in a high-speed crash between a low-rigidity part of one of the vehicle sides and an obstruction such that it is necessary for the passenger protection system to be operated and sending a starting output to the starting device.

16. A side crash determining device according to claim 15, wherein said crash determining device determines that the vehicle is in a low-speed crash between a high-rigidity part of one of the vehicle sides and an obstruction such that it is unnecessary for the passenger protection system to be operated when said second integral output has reached said second threshold value earlier than said first integral output reaches said first threshold value.

17. A side crash determining device according to claim 15, wherein said crash determining device determining that the vehicle is in a high-speed crash between a low-rigidity part of one of the vehicle sides and an obstruction when said second integral output has reached said second threshold value within a predetermined time period after said first integral output reaches a third threshold value.

18. A side crash determining device according to claim 17, wherein said third threshold value is equal to or greater than said first threshold value.

19. A side crash determining device according to claim 1, wherein said high-speed crash is a crash in which another vehicle crashes into the side of the vehicle diagonally from a front of the vehicle and said low-speed crash is a crash in which another vehicle directly crashes with the high-rigidity part of the side of the vehicle.

20. A side crash determining device according to claim 6, wherein said high-speed crash is a crash in which another vehicle crashes into the side of the vehicle diagonally from a front of the vehicle and said low-speed crash is a crash in which another vehicle directly crashes with the high-rigidity part of the side of the vehicle.

21. A side crash determining device according to claim 11, wherein said high-speed crash is a crash in which another vehicle crashes into the side of the vehicle diagonally from a front of the vehicle and said low-speed crash is a crash in which another vehicle directly crashes with the high-rigidity part of the side of the vehicle.

22. A side crash determining device according to claim 15, wherein said high-speed crash is a crash in which another vehicle crashes into the side of the vehicle diagonally from a front of the vehicle and said low-speed crash is a crash in which another vehicle directly crashes with the high-rigidity part of the side of the vehicle.

* * * * *